(No Model.)
T. W. OTTO.
STRAINER AND SIFTER.
No. 599,728. Patented Mar. 1, 1898.
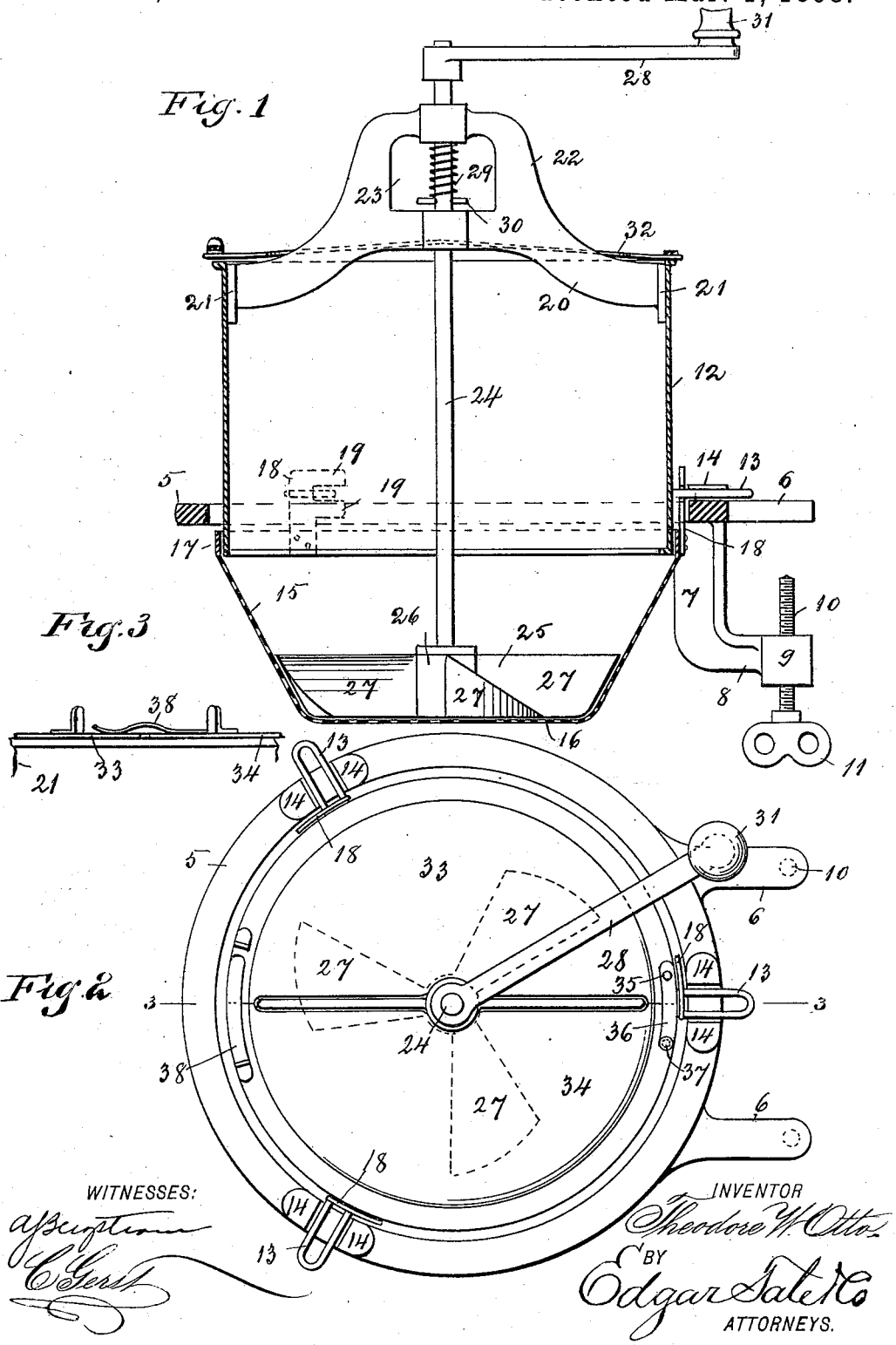

UNITED STATES PATENT OFFICE.

THEODORE W. OTTO, OF STAMFORD, CONNECTICUT.

STRAINER AND SIFTER.

SPECIFICATION forming part of Letters Patent No. 599,728, dated March 1, 1898.

Application filed January 21, 1897. Serial No. 620,053. (No model.)

*To all whom it may concern:*

Be it known that I, THEODORE W. OTTO, a citizen of the United States, residing at Stamford, in the county of Fairfield and State of Connecticut, have invented certain new and useful Improvements in Strainers and Sifters, of which the following is a full and complete specification, such as will enable those skilled in the art to which it appertains to make and use the same.

This invention relates to sifters and strainers; and the object thereof is to provide an improved device of this class for use in sifting and straining fruit, flour, and various other articles; and with these and other objects in view the invention consists in the construction, combination, and arrangement of parts hereinafter described and claimed.

The invention is fully disclosed in the following specification, of which the accompanying drawings form a part, in which—

Figure 1 is a central vertical section of my improved strainer; Fig. 2, a plan view thereof, and Fig. 3 a side view showing a detail of the construction.

In the drawings forming part of this specification the separate parts of my improvement are designated by the same numerals of reference in each of the views, and in the practice of my invention I provide a holder which consists of an annular band 5, one side of which is provided with two projecting arms 6, below each of which is formed a depending arm 7, having an outwardly-directed extension 8, provided with a head 9, which is provided with a screw-threaded vertical bore, through which is passed a screw-threaded bolt or screw 10, the lower end of which is provided with a head or handle 11, and by means of this device the holder 5 may be clamped or otherwise secured to a table or other support.

I also provide a cylindrical casing 12, which is provided near the lower edge thereof with outwardly-directed yokes or loops 13, three of which are shown, and these loops or yokes 13 rest between shoulders or projections 14, formed on the holder 5, and detachably connected with the bottom of the cylindrical casing 12 is a perforated screen 15, the side walls of which are directed inwardly and downwardly, and the bottom 16 thereof, together with the side walls, is perforated, and said screen is provided at its upper edge with an annular rim or band 17, to which are secured upwardly-directed arms 18, three of which are shown, and which correspond with the loops or yokes 13, and said arms are shown in dotted lines in Fig. 1 and are provided at their upper ends with shoulders or projections 19, between which the yokes or loops 18 are adapted to be passed, and by this means the screen 15 is suspended from the casing 12 and said casing and said screen are connected with the holder 5.

Rigidly connected with or bolted to the opposite sides of the top of the casing 12 is a cross-head 20, the connection of said cross-head with the casing 12 being shown at 21, and said cross-head is provided with an upwardly-directed central portion 22, in which is formed an opening 23, and passing vertically through said cross-head and through said opening is a shaft 24, to the lower end of which is secured a stirrer 25, which consists of a head 26, provided with radial wings or blades 27, which are shown in dotted lines in Fig. 2 and part of which are shown in full lines in Fig. 1, and said wings or blades are preferably curved in the manner of propeller-blades, and the bottoms or lower edges thereof conform to the shape of the bottom portion of the screen 15.

The upper end of the shaft 24 is provided with a crank-arm 28, and mounted on said shaft in the opening 23 of the cross-head 20 is a spiral spring 29, the upper end of which bears on the upper portion of said cross-head and the lower end of which bears on a pin 30, which is passed through the shaft 24, and the object of this spring 29 is to force the shaft 24 downwardly, so that the stirrer at the lower end thereof will press on the bottom of the screen 15.

The crank-arm 28 is provided with a knob or handle 31, and I also provide a cap or cover 32 for the casing 12, which consists of two semicircular parts 33 and 34, and between these parts 33 and 34 of the cap or cover the cross-head 20 passes, and secured to one of said parts at 35 is an arm 36, with which the other part is pivotally connected at 37, and this connection serves as a hinge for the parts 33 and 34 of the cap or cover, and one of said parts is provided on the opposite side with a spring 38, which overlaps the other part and holds the separate parts of the cap or cover in position.

The operation will be readily understood from the foregoing description when taken in connection with the accompanying drawings and the following statement thereof.

The material to be sifted or strained is placed in the casing 11 after the strainer 15 is secured thereto, and by turning the shaft 24 by means of the crank-arm 28 the material is stirred and agitated until it is passed through the strainer, the stirrer at the bottom of the shaft 24 serving to keep the material in motion and also to force it through the strainer.

The shaft 24 and the stirrer may be raised by means of the crank-arm 28 whenever desired against the operation of the spring 15, and the chief object of this construction is to provide means for attaching and detaching the strainer, as will be readily understood, and the spring 19 will serve to keep the shaft 24 and the stirrer on the lower end thereof in proper position in the operation of the device.

It will thus be seen that I accomplish the object of my invention by means of a device which is simple in construction and operation and perfectly adapted to accomplish the result for which it is intended; and it will be apparent that changes in and modifications of the construction herein described may be made without departing from the spirit of my invention or sacrificing its advantages.

Having fully described my invention, I claim as new and desire to secure by Letters Patent—

1. In a strainer and sifter of the character described, an annular ring or band provided with means for securing the same to a suitable support, a casing provided with lugs or projections adapted to rest on said annular ring, and a perforated screen provided with a band or ring at the upper edge thereof, arms secured to said band or ring, said arms being provided with projections at one side thereof adapted to engage the lugs or projections formed on said casing, substantially as and for the purpose described.

2. The herein-described strainer or sifter, comprising a holder adapted to be secured to a suitable support, a cylindrical casing having yokes 13, adapted to rest on said holder, a perforated screen 15 provided with a band 17 having arms 18 provided with projections 19; a cross-head 20, provided with an opening 23; a shaft 24, provided with a stirrer 25 consisting of a head 26, and blades 27, said shaft being provided with a crank 28 and a spiral spring 29; a cap or cover 32 consisting of two parts 33 and 34, one of said parts being provided with an arm 36 with which the other part is pivotally connected and one of said parts being provided with a spring 38, all combined substantially as shown and described.

In testimony that I claim the foregoing as my invention I have signed my name, in presence of the subscribing witnesses, this 16th day of January, 1897.

THEODORE W. OTTO.

Witnesses:
JOSEPH L. WOLFE,
PAUL OTTO.